United States Patent
Ambilkar et al.

(10) Patent No.: US 7,382,230 B2
(45) Date of Patent: Jun. 3, 2008

(54) COMPARING COUNTER CONTENTS FOR TIMING CRITICAL APPLICATIONS

(75) Inventors: Shridhar N. Ambilkar, Bangalore (IN); Girish G. Kurup, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/859,070

(22) Filed: Sep. 21, 2007

(65) Prior Publication Data

US 2008/0008288 A1    Jan. 10, 2008

Related U.S. Application Data

(63) Continuation of application No. 11/153,587, filed on Jun. 14, 2005, now Pat. No. 7,283,038.

(51) Int. Cl.
  *G05B 1/00* (2006.01)
  *G05F 7/02* (2006.01)
(52) U.S. Cl. .................................. 340/146.2
(58) Field of Classification Search ............ None
  See application file for complete search history.

(56) References Cited

U.S. PATENT DOCUMENTS

| | | |
|---|---|---|
| 3,983,329 A | 9/1976 | Rock |
| 4,089,060 A | 5/1978 | Mitchell |
| 4,251,877 A | 2/1981 | Scheer |
| 4,255,809 A | 3/1981 | Hillman |
| 4,580,275 A | 4/1986 | Pirani et al. |
| 4,881,040 A | 11/1989 | Vaughn |
| 5,031,147 A | 7/1991 | Maruyama et al. |
| 5,257,216 A | 10/1993 | Sweedler |
| 5,281,946 A | 1/1994 | Van Le |
| 5,365,527 A | 11/1994 | Honma |
| 5,436,914 A | 7/1995 | Augustine et al. |
| 5,524,270 A | 6/1996 | Haess et al. |
| 5,594,631 A | 1/1997 | Katoozi et al. |
| 5,982,837 A | 11/1999 | Earnest |
| 6,088,601 A | 7/2000 | Miyagi |
| 6,263,450 B1 | 7/2001 | Predko |
| 7,283,038 B2 * | 10/2007 | Ambilkar et al. ........ 340/146.2 |

FOREIGN PATENT DOCUMENTS

| | | |
|---|---|---|
| GB | 1593381 | 7/1981 |
| JP | 56139908 | 9/1981 |

* cited by examiner

*Primary Examiner*—Tuan T Lam
(74) *Attorney, Agent, or Firm*—Schmeiser, Olson & Watts; William H. Steinberg

(57) ABSTRACT

An electrical circuit and method to compare contents of counter circuits. The electrical circuit comprises a first counter circuit and a second counter circuit electrically connected to a flip-flop circuit through a logic circuit and OR gates connected to the flip flop circuit. The first counter circuit is for receiving a first enable signal and generating a first output signal. The second counter circuit is for receiving a second enable signal and generating a second output signal. The first enable signal and the second enable signal are for comparing the first output signal to the second output signal. The flip-flop circuit is for generating a first status signal defining a first relationship between the first output signal and the second output signal. The logic circuit is for generating a second status signal defining a second relationship between the first output signal and the second output signal.

13 Claims, 4 Drawing Sheets

COMPARING COUNTER CONTENTS FOR TIMING CRITICAL APPLICATIONS

This application is a Continuation of Ser. No. 11/153,587, filed Jun. 14, 2005 now U.S. Pat. No. 7,283,038.

BACKGROUND OF THE INVENTION

1. Technical Field

The present invention relates to a circuit and associated method to compare contents of counter circuits.

2. Related Art

Electrical circuits are typically required to compare different electrical signals comprising data. Comparing different electrical signals comprising data may be time consuming and require extensive circuitry which may be costly. Therefore there is a need to provide a simple low cost electrical circuit to compare different electrical signals comprising data.

SUMMARY OF THE INVENTION

The present invention provides an electrical circuit, comprising:

a first counter circuit A for receiving a first enable signal INC_A and generating a first output signal SIG_A;

a second counter circuit B for receiving a second enable signal INC_B and generating a second output signal SIG_B, wherein the first enable signal INC_A and the second enable signal INC_B are for comparing the first output signal SIG_A to the second output signal SIG_B;

a flip-flop circuit for generating a first status signal defining a first relationship between said first output signal SIG_A and said second output signal SIG_B; and a logic circuit for generating a second status signal defining a second relationship between said first output signal SIG_A and said second output signal SIG_B, wherein the logic circuit electrically connects said first counter circuit A and said second counter circuit B to said flip-flop circuit, wherein an output of said first counter circuit A is electrically connected to a first input of said logic circuit, wherein an output of said second counter circuit B is electrically connected to a second input of said logic circuit, and wherein an output of said logic circuit is electrically connected to an enable input E on said flip-flop circuit.

The present invention provides a method, comprising:

providing an electrical circuit comprising a first counter circuit A, a second counter circuit B, a flip-flop circuit, and a logic circuit, wherein an output of said first counter circuit A is electrically connected to a first input of said logic circuit, wherein an output of said second counter circuit B is electrically connected to a second input of said logic circuit, and wherein an output of said logic circuit is electrically connected to an enable input E on said flip-flop circuit;

receiving by said first counter circuit A, a first enable signal INC_A;

generating by said first counter circuit A, a first output signal SIG_A;

receiving by said second counter circuit B, a second enable signal INC_B;

generating by said second counter circuit B, a second output signal SIG_B;

comparing by said first enable signal INC_A and said second enable signal INC_B, said first output signal SIG_A to said second output signal SIG_B;

generating by said flip-flop circuit, a first status signal defining a first relationship between said first output signal SIG_A and said second output signal SIG_B; and generating by said logic circuit, a second status signal defining a second relationship between said first output signal SIG_A and said second output signal SIG_B.

The present invention provides a method for forming an electrical circuit, comprising:

providing a first counter circuit, a second counter circuit, a flip-flop circuit, and a logic circuit;

electrically connecting an output of said first counter circuit to a first input of said logic circuit;

electrically connecting an output of said second counter circuit to a second input of said logic circuit; and electrically connecting an output of said logic circuit to an enable input E on said flip-flop circuit.

The present invention provides a computer program product, comprising a computer usable medium having a computer readable program code embodied therein, said computer readable program code comprising an algorithm adapted to implement a method for simulating a formation of an electrical circuit, said method comprising the steps of:

providing a first counter circuit, a second counter circuit, a flip-flop circuit, and a logic circuit;

electrically connecting an output of said first counter circuit to a first input of said logic circuit;

electrically connecting an output of said second counter circuit to a second input of said logic circuit; and electrically connecting an output of said logic circuit to an enable input E on said flip-flop circuit.

The present invention provides a method for simulating a formation of an electrical circuit, comprising integrating computer-readable code into a computing system, wherein the code in combination with the computing system is capable of performing the steps of:

providing a first counter circuit, a second counter circuit, a flip-flop circuit, and a logic circuit;

electrically connecting an output of said first counter circuit to a first input of said logic circuit;

electrically connecting an output of said second counter circuit to a second input of said logic circuit; and electrically connecting an output of said logic circuit to an enable input E on said flip-flop circuit.

The present invention provides advantageously provides a simple low cost electrical circuit to compare different electrical signals comprising data.

DETAILED DESCRIPTION OF THE INVENTION

Figure 1:
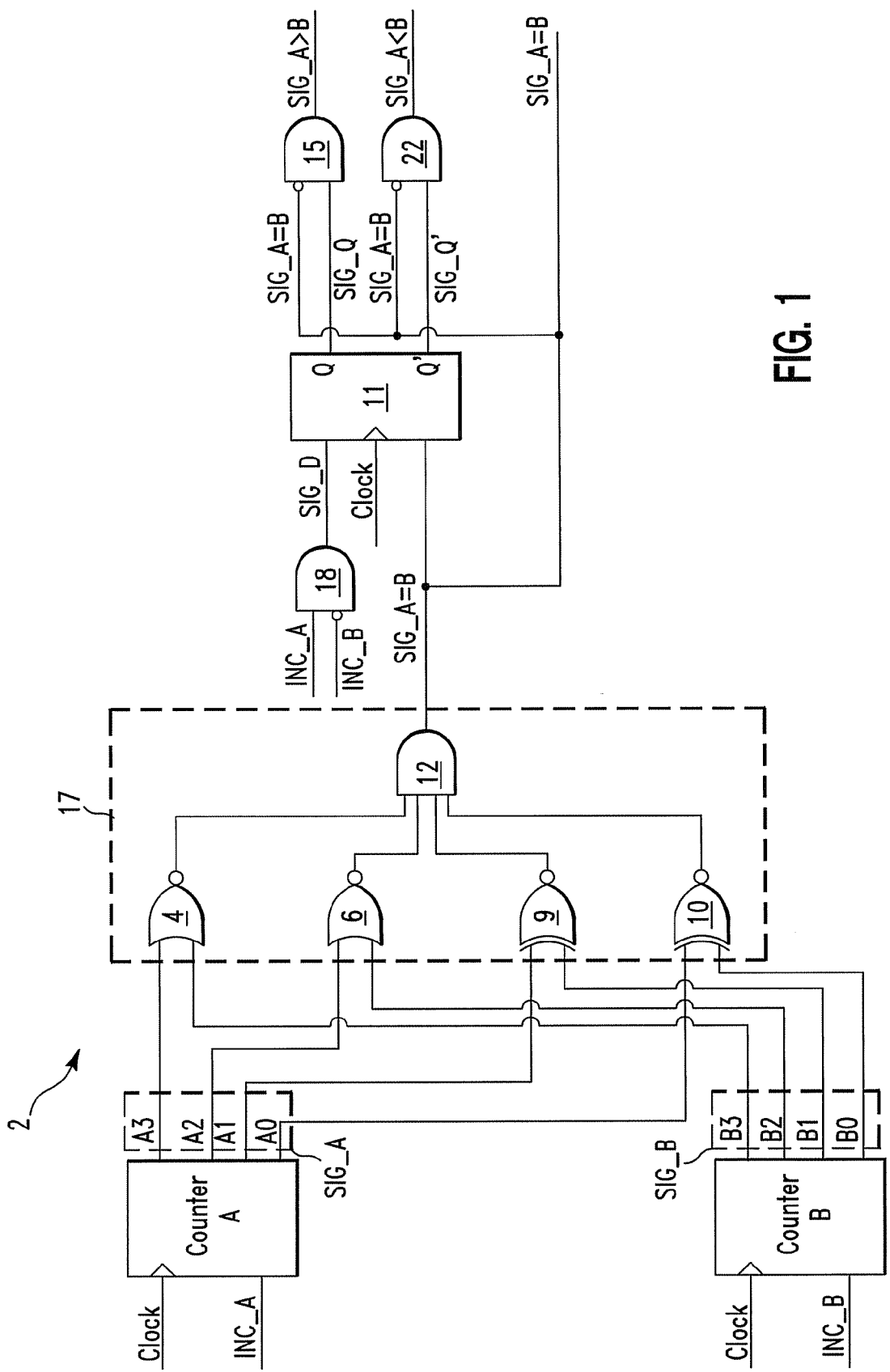
FIG. 1 illustrates an a schematic of an electrical circuit, in accordance with embodiments of the present invention.

FIG. 1 illustrates an a schematic of an electrical circuit 2, in accordance with embodiments of the present invention. The electrical circuit 2 comprises a flip-flop circuit 11, counter circuits: Counter A and Counter B, AND gates 15, 18, and 22 and a logic circuit 17. The logic circuit 17 comprises exclusive NOR gates (XNOR) 4, 6, 9, and 10 and an AND gate 12. The logic circuit 17 may comprise, inter alia, a comparator circuit. Counter A and counter B are each electrically coupled to an input of logic circuit 17. An output of logic circuit 17 is electrically coupled to an enable input E of the flip-flop circuit 11. An output of the AND gate 18 is electrically coupled to a data input D of the flip-flop circuit 11. Outputs Q and Q' of the flip-flop circuit 11 are electrically coupled to inputs of the AND gates 15 and 22 respectively. There are many circuit applications that require comparison of contents (e.g., contents A0, A1, A2, and A3 with contents B0, B1, B2, and B3) within two counters (e.g.,Counter A and Counter B). In most cases, both counters will be reset (i.e., initialized with a logic low) or preset with a known value (for example, see FIG. 2 and FIG. 3) when the hardware (e.g., electrical circuit 2) is initialized. During operation of the circuit 2, the counters will be incremented/decremented independently based on different conditions. There may be a requirement (i.e., within a logic circuit) to compare counter contents and provide a relationship between the contents to make a decision in a logic circuit.

The electrical circuit 2 compares an output signal SIG_A (i.e., counter A contents) from counter A with an output signal SIG_B (i.e., counter B contents) from counter B and generates a status signal(s) (e.g., signal SIG_A>B, signal SIG_A<B, signal SIG_A=B) definining a relationship between the output signal SIG_A and the output signal SIG_B. FIG. 1 illustrates output signal SIG_A comprising a four-bit word A0 . . . A3 and output signal SIG_B comprising a four-bit word B0 . . . B3 for illustration purposes. Note that the circuit 2 may be adapted to compare content of any size from counter A with content of any size from counter B.

The status signals SIG_A>B, SIG_A<B, and SIG_A=B are generated using the following procedure. At an initial condition (e.g., a hardware initialization), counter A and counter B are each reset to a logical low. Signals INC_A and INC_B each represent an enable signal. Signal INC_A is applied to counter A. Signal INC_B is applied to counter B. When signal INC_A comprises a logical high, counter A contents (i.e., output signal SIG_A) are incremented by one during each clock cycle. When signal INC_B comprises a logical high, counter B contents (i.e., output signal SIG_B) are incremented by one during each clock cycle. The signals INC_A and INC_B along with the logic circuit 17 are used to generate a first relationship between output signal SIG_A and output signal SIG_B and represented by an signal SIG_A=B. The signal SIG_A=B indicates that counter A contents (i.e., SIG_A) are equal to counter B contents (i.e., SIG_B). The signal SIG_A=B is located on an output of the AND gate 12. The signal SIG_A=B may be applied to external logic circuitry that requires a signal to indicate that counter A contents are equal to counter B contents. Additionally, the signal SIG_A=B is applied to an enable input on the flip-flop circuit 11 to enable the flip-flop circuit 11 to generate another status signal(s) (e.g., signal SIG_A>B or signal SIG_A<B) definining a relationship between the output signal SIG_A and the output signal SIG_B. The signals INC_A and INC_B are additionally applied to inputs of the AND gate 18 thereby creating an output signal SIG_D from the AND gate 18 that is applied to a data input D on the flip-flop circuit 11. The signal SIG_A=B is additionally applied to each of the AND gates 15 and 22. The signals INC_A and INC_B applied to the inputs of the AND gate 18 and the signal SIG_A=B applied to the enable input E on the flip-flop circuit 11 are used to control the flip-flop circuit 11 to generate the signal SIG_A>B and signal SIG_A<B on outputs of AND gates 15 and 22 respectively. The signals INC_A and INC_B applied to the inputs of the AND gate 18 determine the output signal SIG_D and in turn the output signal SIG_D updates the flip-flop circuit 11 based on the a logic state of the signals INC_A and INC_B. The signal SIG_A=B applied to the enable input E on the flip-flop circuit 11 enables or disables the flip-flop circuit 11 dependent upon a logic state of the signal SIG_A=B. The signals SIG_A>B and SIG_A<B are generated when one counter content crosses the other (i.e., Counter A and Counter B). Both counters contents become equal for at least one clock cycle before the cross over condition. With this condition, the signal SIG_A=B changes to signal SIG_A>B or signal_A<B. Although the circuit 2 comprises both the AND gates 15 and 22, note that the circuit 2 may comprise only AND gate 15 in a case where only the SIG_A>B is required or the circuit 2 may comprise only AND gate 22 in a case where only the SIG_A<B is required. Table 1 below illustrates a truth table denoting signal logic levels (i.e., logic high: 1 and logic low: 0) for signal SIG_A=B applied to the enable input E of the flip-flop circuit 11, signal logic levels for the signals INC_A and INC_B applied to the inputs of the AND gate 18, and signal logic levels for the signal SIG_D applied to the data input D of the flip-flop circuit 11. The logic levels are used to control the flip-flop circuit 11 to generate the signal SIG_A>B and signal SIG_A<B on outputs of AND gates 15 and 22 respectively. Signal SIG_D applied to the data input D of the flip-flop circuit 11.

TABLE 1

| A = B | INC_A | INC_B | D |
|---|---|---|---|
| 0 | x | x | D(n − 1) |
| 1 | 0 | 0 | 0 |
| 1 | 0 | 1 | 0 |
| 1 | 1 | 0 | 1 |
| 1 | 1 | 1 | 0 |

As illustrated in Table 1, when signal SIG_A=B is at a logic low (i.e., logic 0), the flip-flop circuit 11 content will hold a current value (i.e., flip-flop circuit 11 contents will not be changed). When signal SIG_A=B is at logic high (i.e., logic 1), the flip-flop circuit 11 content is updated according to a logic state of the signals INC_A and INC_B.

The AND gate 15 is used to block an output signal SIG_Q from the output Q of the flip-flop circuit 11 when counter A contents equals counter B contents (i.e., signal SIG_A=B is generated). At this point, signal SIG_A=B comprises a logic high and blocks the flip-flop circuit 11 output (i.e., the signal SIG_Q from the output Q of the flip-flop circuit 11) from reaching the signal SIG_A>B (signal SIG_A=B output is a logic high when counter A contents equals counter B contents). Since signal SIG_A=B is high when counter A and counter B comprise equal content, the flip-flop circuit 11 will be updated only in a next clock cycle and the signal SIG_A>B is generated on an output of the AND gate 15. Likewise, the signal SIG_A<B is generated on an output of the AND gate 22. Table 2 below illustrates a truth table denoting signal logic levels for signals SIG_A>B, SIG_A<B, and SIG_A=B dependent upon the relationship between the contents counter A and counter B.

TABLE 2

| Relationship Between Counter Contents | SIG_A > B | SIG_A < B | SIG_A = B |
|---|---|---|---|
| counter A > counter B | 1 | 0 | 0 |
| counter A < counter B | 0 | 1 | 0 |
| counter A = counter B | 0 | 0 | 1 |

Figure 2:
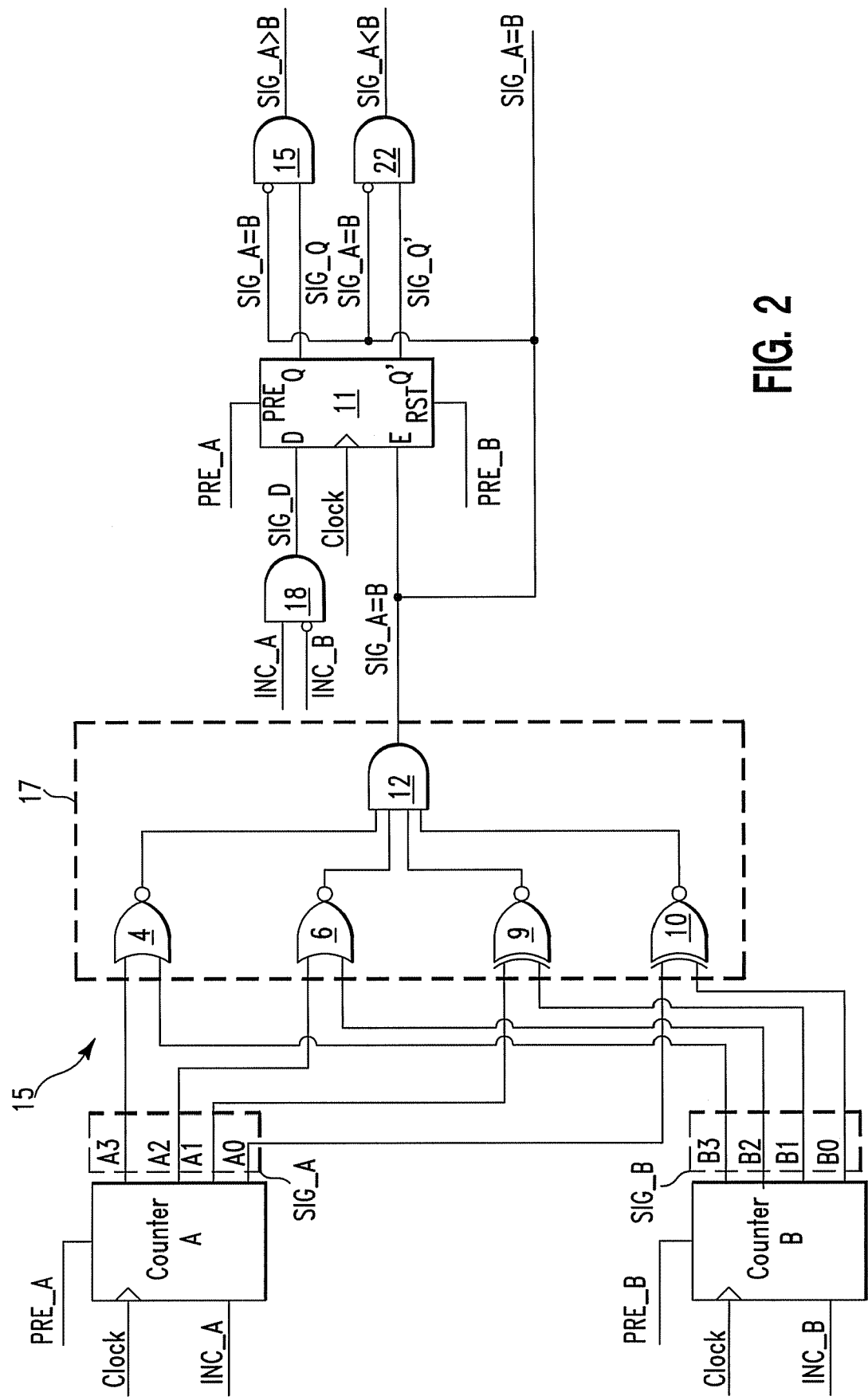
FIG. 2 illustrates a modified schematic of the electrical circuit of FIG. 1, in accordance with embodiments of the present invention.

FIG. 2 illustrates a modified schematic of the electrical circuit 2 of FIG. 1 represented by a circuit 15, in accordance with embodiments of the present invention. In contrast with the electrical circuit 2 of FIG. 1, the circuit 15 of FIG. 2 comprises a signal PRE_A applied to the counter A and a signal PRE_B applied to the counter B. Additionally, the signals PRE_A and PRE_B are applied to the flip-flop circuit 11. The signal PRE_A is applied to a preset input PRE on the flip-flop circuit 11. The signal PRE_B is applied to a reset input RST on the flip-flop circuit 11. The signals PRE_A and PRE_B are used to set or reset the flip-flop circuit 11 respectively if one of the counters Counter A or Counter B is preset with a value during initialization of the circuit 15. During a reset function, if a value (i.e., for content) is preset in the Counter A, the flip-flop circuit 11 will be set indicating that Counter A content is larger than counter B content. Likewise, presetting a value (i.e., for content) in Counter B will reset the flip-flop circuit 11.

Figure 3:
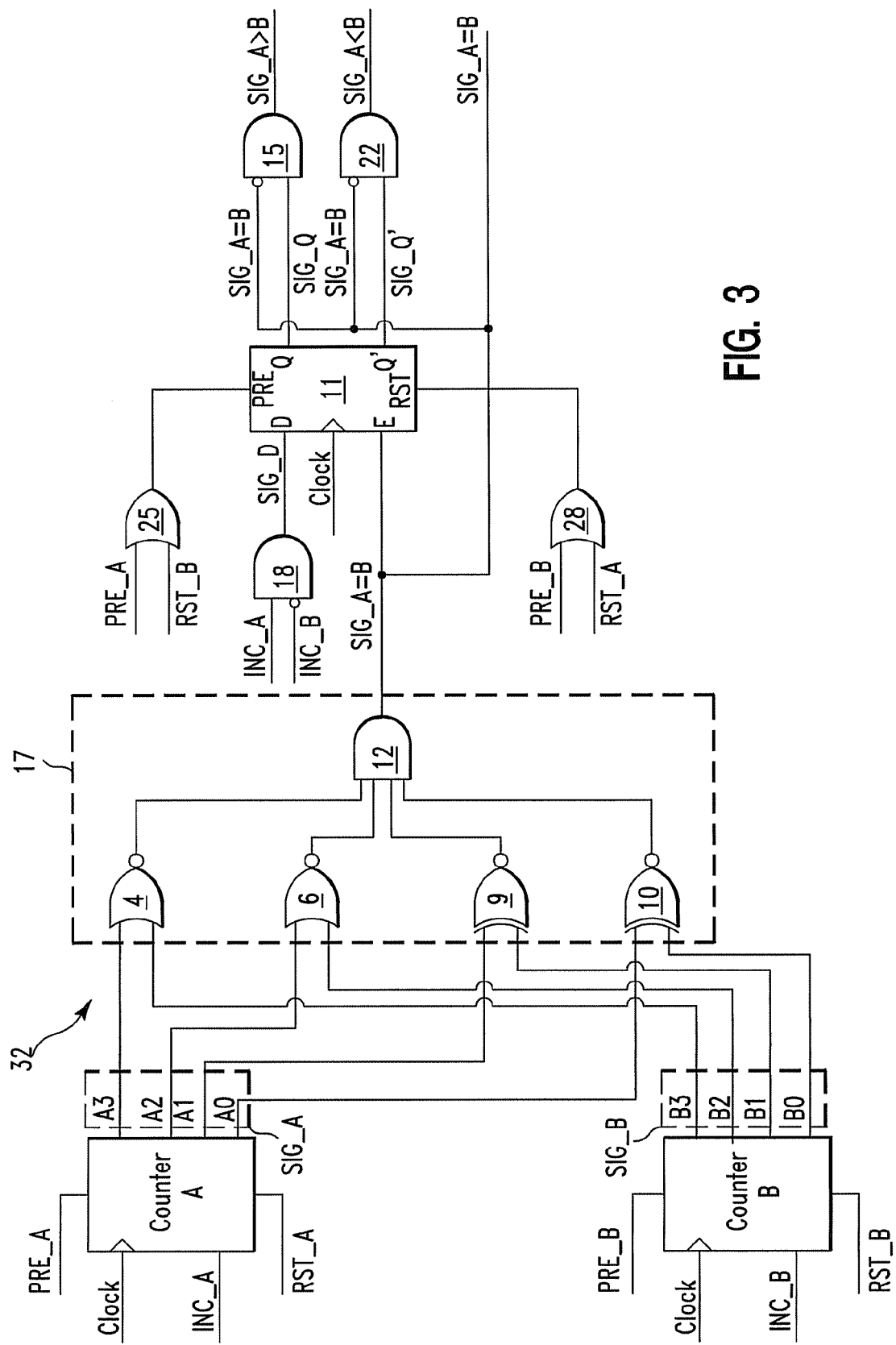
FIG. 3 illustrates a modified schematic of the electrical circuit of FIG. 2, in accordance with embodiments of the present invention.

FIG. 3 illustrates a modified schematic of the electrical circuit 15 of FIG. 2 represented by a circuit 32, in accordance with embodiments of the present invention. In contrast with the electrical circuit 15 of FIG. 2, the circuit 32 of FIG. 3 comprises a signal RST_A applied to the Counter A and a signal RST_B applied to the Counter B. Additionally, the circuit 32 comprises OR gates 25 and 28 electrically coupled to the flip-flop circuit 11. The OR gate 25 is coupled to a input PRE on the flip-flop circuit 11. The OR gate 28 is coupled to an input RST on the flip-flop circuit 11. The signals PRE_A and RST_B are applied to the OR gate 25. The signals PRE_B and RST_A are applied to the OR gate 28. The signals RST_A and RST_B are the reset signals for Counter A and Counter B respectively. Whenever Counter B is reset, the flip-flop circuit 11 is set to indicate that Counter A content is larger than counter B content. Signal RST_B is ORed with signal PRE_A (i.e., through the OR gate 25) and applied on the input PRE of the flip-flop circuit 11. Likewise, signal RST_A signal is ORed with signal PRE_B (i.e., through the OR gate 28) and applied the input RST of the flip-flop circuit 11. The aforementioned process will assure that when Counter A is reset, the flip-flop circuit 11 will also be reset to reflect a new status.

Figure 4:
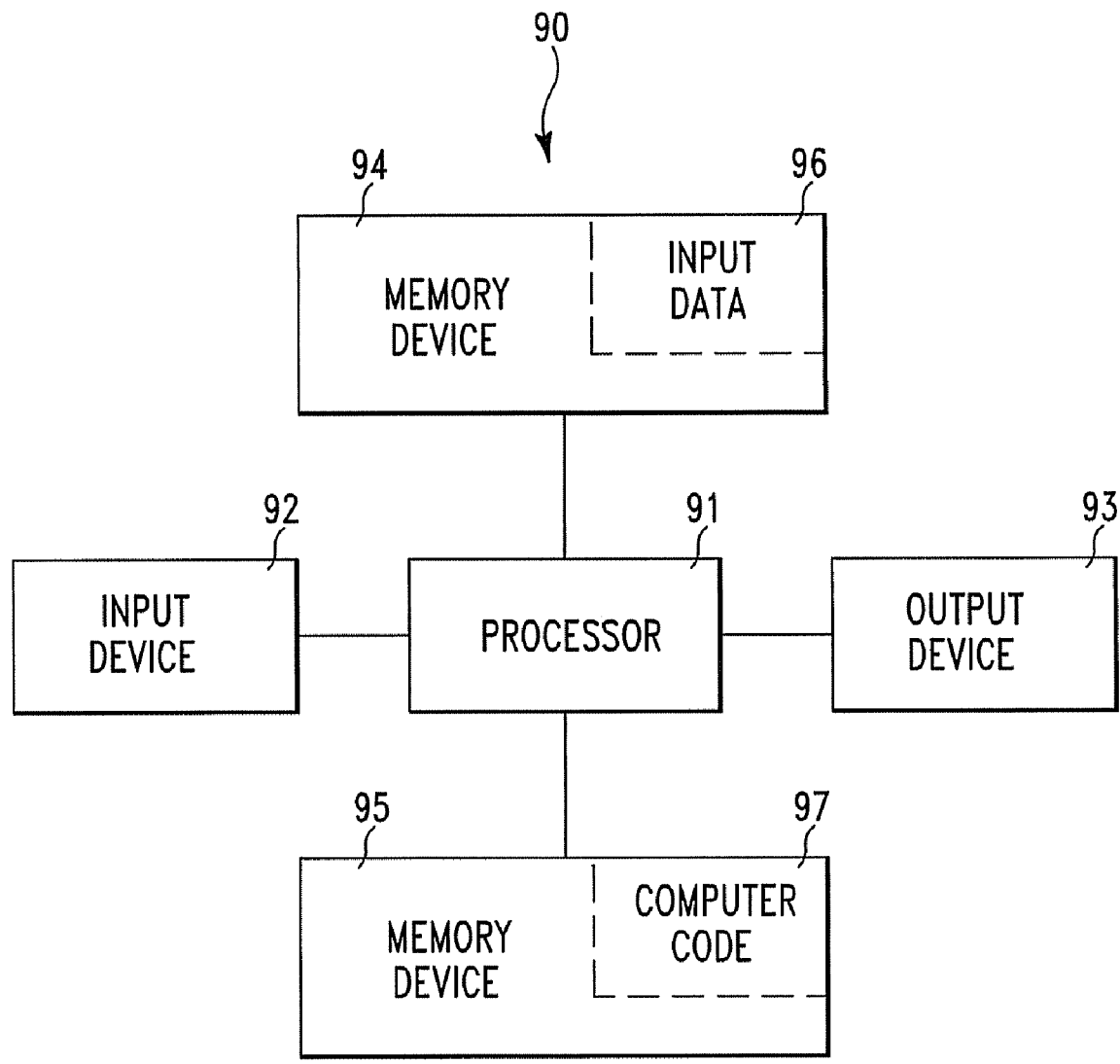
FIG. 4 illustrates a computer system used for simulating a formation of an electrical circuit, in accordance with embodiments of the present invention.

FIG. 4 illustrates a computer system 90 used for simulating a formation of an electrical circuit, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for simulating a formation of an electrical circuit. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for simulating a formation of an electrical circuit.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
providing an electrical circuit comprising a first counter circuit A, a second counter circuit B, a flip-flop circuit, a first OR gate, a second OR gate, and a logic circuit, wherein an output of said first counter circuit A is electrically connected to a first input of said logic circuit, wherein an output of said second counter circuit B is electrically connected to a second input of said logic circuit, wherein an output of said logic circuit is electrically connected to an enable input E on said flip-flop circuit, wherein said first OR gate is electrically connected to an input PRE of the flip-flop circuit, and wherein said second OR gate is electrically connected to an input RST of the flip-flop circuit;
receiving by said first counter circuit A, a first enable signal INC_A;
generating by said first counter circuit A, a first output signal SIG_A;
receiving by said second counter circuit B, a second enable signal INC_B;
generating by said second counter circuit B, a second output signal SIG_B;
comparing by said first enable signal INC_A and said second enable signal INC_B said first output signal SIG_A to said second output signal SIG_B;
generating by said flip-flop circuit, a first status signal defining a first relationship between said first output signal SIG_A and said second output signal SIG_B;
generating by said logic circuit, a second status signal defining a second relationship between said first output signal SIG_A and said second output signal SIG_B;

receiving by said first OR gate, a signal PRE_A and a signal RST_B;

generating, by said first OR gate from said signal PRE_A and said signal RST_B, a first ORed signal;

applying by said first OR gate, said first ORed signal to said input PRE of the flip-flop circuit;

receiving by said second OR gate, a signal PRE_B and a signal RST_A;

generating by said second OR gate from said signal PRE_B and said signal RST_A a second ORed signal; and applying by said second OR gate, said second ORed signal to said input RST of the flip-flop circuit.

2. The method of claim 1, further comprising:

generating on said output of said logic circuit said second status comprising a signal SIG_A=B representing said first output signal SIG_A being equal to said second output signal SIG_B; and applying said signal SIG_A=B to said enable input on said flip-flop circuit.

3. The method of claim 2, wherein said signal SIG_A=B comprises a logical high.

4. The method of claim 2, further comprising:

providing a first logic gate, wherein an output of said first logic gate is electrically connected to a data input D of said flip-flop circuit; and receiving by said first logic gate, said first enable signal INC_A and said second enable signal INC_B.

5. The method of claim 4, further comprising:

providing a second logic gate comprising an output, wherein said flip-flop circuit comprises a first output Q, wherein an input of said second logic gate is electrically connected to said first output Q;

generating on an output of said second logic gate, said first status signal defining said first relationship on said output of said second logic gate.

6. The method of claim 5, wherein said signal SIG_A=B comprises a logical low, and wherein said first status signal defining said first relationship is dependent upon said signal SIG_A=B comprising the logical low and logical state of said first enable signal INC_A and said second enable signal INC_B.

7. A computing system comprising a processor coupled to a computer-readable memory unit, said memory unit comprising a computer readable code configured to be executed by the processor to perform the method of claim 1.

8. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

9. A computer program product, comprising a computer storage medium comprising a computer readable program code embodied therein, said computer readable program code configured to perform the method of claim 1 upon being executed by a processor of a computing system.

10. A method for forming an electrical circuit, comprising:

providing a first counter circuit, a second counter circuit, a flip-flop circuit, a logic circuit, a first OR gate, a second OR gate, and a first logic gate;

electrically connecting an output of said first counter circuit to a first input of said logic circuit;

electrically connecting an output of said second counter circuit to a second input of said logic circuit; and electrically connecting an output of said logic circuit to an enable input E on said flip-flop circuit;

electrically connecting an output of said first logic gate to a data input D of said flip-flop;

electrically connecting an output of said first OR gate to an input PRE of the flip-flop circuit; and electrically connecting an output said second OR gate to an input RST of the flip-flop circuit.

11. The method of claim 10, further comprising:

providing a second logic gate, wherein said flip-flop circuit comprises a first output Q; and electrically connecting an input of said second logic gate to said first output Q.

12. The method of claim 11, further comprising:

providing a third logic gate, wherein said flip-flop circuit comprises a second output Q'; electrically connecting an input of said third logic gate to said second output Q'.

13. The method of claim 12, wherein said first logic gate, said second logic gate, and said third logic gate each comprise an AND gate.

* * * * *